Feb. 7, 1950     E. H. LARKINS     2,496,800

CUTTER ADJUSTER

Filed Nov. 5, 1947

*INVENTOR.*
EMIL H. LARKINS
BY
Hyde, Meyer, Baldwin & Doran
ATTORNEYS

Patented Feb. 7, 1950

2,496,800

UNITED STATES PATENT OFFICE 2,496,800

CUTTER ADJUSTER

Emil H. Larkins, Cleveland, Ohio

Application November 5, 1947, Serial No. 784,228

2 Claims. (Cl. 29—256)

This invention relates to adjusting devices for the cutting blades of planing machines.

The object of the invention is to provide a simple but effective adjuster which can be applied to the cutting blades while in place in their slots in the holder, which is easily operated, which accurately locates the blades, which can be made and sold at low cost, and which is durable in operation and not likely to get out of order.

Further objects in part are obvious and in part will appear more in detail hereinafter.

While the adjuster may be used for setting any elongated blades or cutters mounted in slots in a cylindrical carrier or holder, it is more particularly adapted for use with the blades of a planing machine, or a joiner, and for convenience has been shown as used upon an overhead planer in which the cutting roll is supported above the work, although the invention is not so limited.

The planer shown comprises a suitable frame having spaced side members 10 between which extends the cutter holding cylinder 11 provided with reduced shaft end portions 12 extending into the frame, one of which is provided with suitable driving or rotating means (not shown). Usually in these machines the cylinder ends stop short of the frame member, being separated or spaced therefrom by a matter of the order of one-quarter or three-eighths of an inch, a space too narrow or restricted for the entrance thereinto of a large or bulky tool or tool part.

Figure 1:
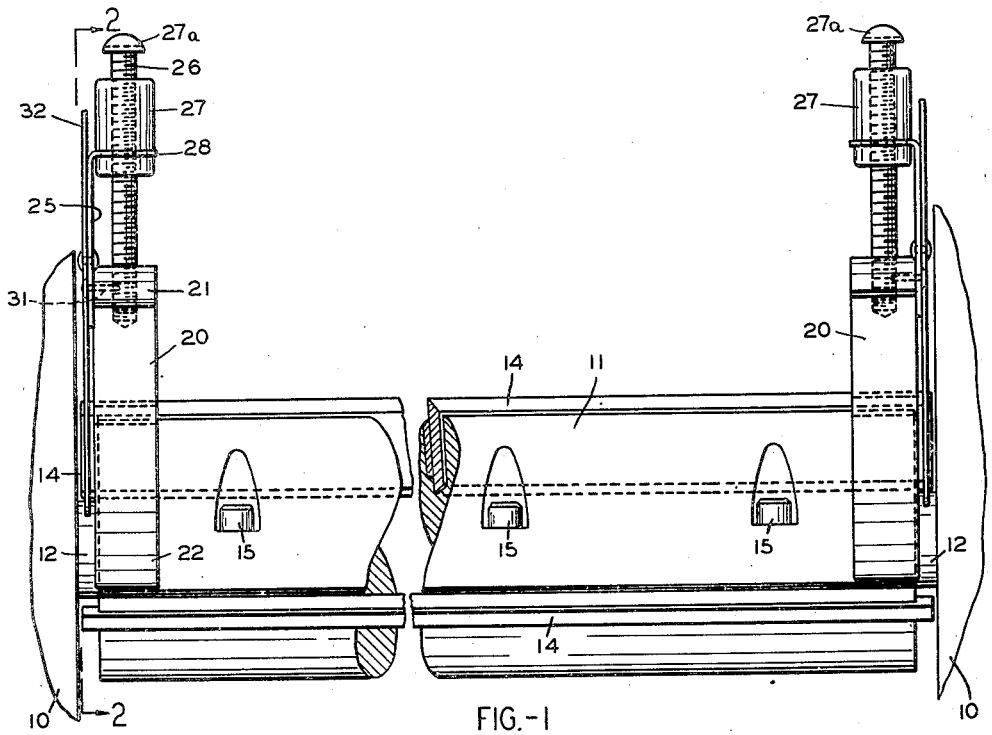
Fig. 1 represents a front elevation of a portion of a planing machine, with the cutter housing removed, and with two of my adjusters in operating position for setting the cutter blades.

Cylinder 11 is provided with any suitable number, three being shown, of generally radially extending, but inclined slots 13 in each of which is supported an elongated cutting blade 14 secured in place by several clamping screws 15 operating upon clamping blocks or gibs 16, one lying alongside of each blade. The blades usually are slightly longer than the cylinder body, so that each end of each blade projects outwardly endwise into the narrow space between the cylinder end and the frame member, as shown in Fig. 1.

Accurate work demands that the cutting edges of all blades, from end to end of each, should lie at the same distance from the axis of rotation of the blade holder. Thus when blades are removed and sharpened or reground, or when installing new blades, it is necessary to accurately set them, an operation readily accomplished with the adjusting device of my invention.

This comprises a solid body 20 having a head 21 and two legs 22 spaced apart and formed on their inner surfaces with a semi-cylindrical surface 23 corresponding to the cylindrical surface of the holder 11. The legs are long enough to embrace a little more than half the cylinder circumference and are resilient so that when pushed down to proper position, shown in Fig. 2, the device is resiliently held in place by the legs.

In the body is a cavity 24, the upper curved surface 24a of which is carefully formed to lie at the proper distance from the central axis, or, more accurately at the proper height or level above the outer cylindrical surface of the holder, assuming that to be a true cylinder symmetrical about its own axis. Such height may be any desired or suitable amount, say one-eighth inch. Thus it may be and is used as a limiting stop in setting the blade.

Upon one end face of the body is mounted an adjusting member in the form of a thin metal plate 25, said plate being provided with means for adjusting it. The means shown consists of a nonrotatable screw 26 threaded into the body and provided with a rotatable operating nut 27 below its head 27a. Plate 25 has a flange 28 provided with two arms 29, the edges of which enter an annular groove in the nut 27, so that upon nut rotation the plate travels with the nut, in one direction or the other, along the line of a guiding slot 30 in the plate through which extends the shank of a headed pin 31 secured in the body.

Figures 2, 3:
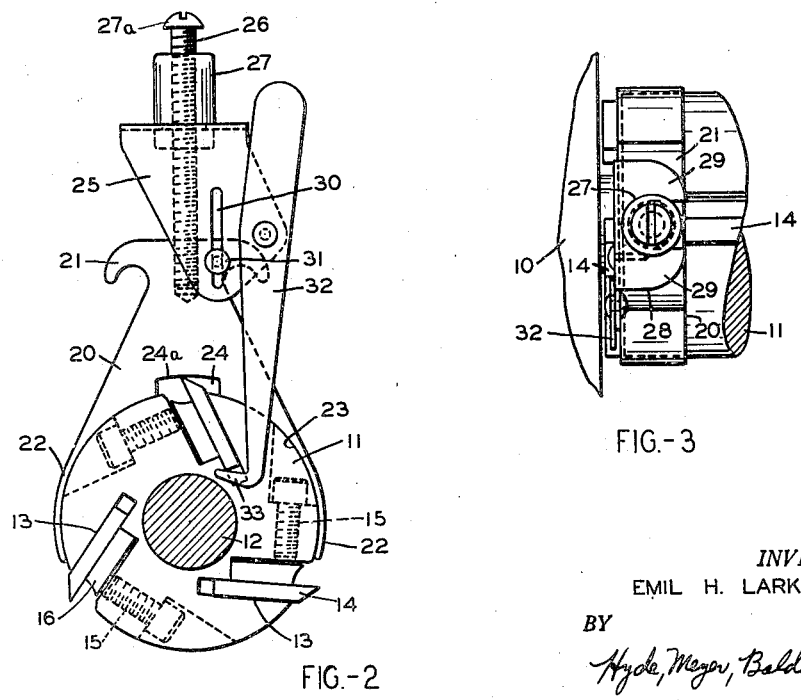
Fig. 2 is a side elevation of one adjuster, the view being taken on the line 2—2, Fig. 1.
Fig. 3 is a plan view of the left-hand adjuster shown in Fig. 1.

On plate 25 is pivotally mounted a thin metal lever 32 having a toe 33 adapted by suitable adjustment of the lever about its pivot to be moved into a position beneath the inner edge of the cutter blade, as shown in Fig. 2.

The device is used as follows:

Let us assume that in a given planing machine the housing, cover or any other parts which ordinarily cover and conceal the blade holding cylinder or a part thereof have been removed to fully expose it to view and their manipulation. Further, a new cutting blade, or an old blade resharpened, has been inserted into place with its clamping block 16 alongside of it but with the clamping screws backed off. The blade, of course, is withdrawn or lies inwardly from its desired cutting position.

One of my adjusting devices, with the nut 27 screwed down below the position shown in Fig. 2, is applied to the end of the holding cylinder in the position shown at the left in Fig. 1. The plate 25 and lever 32 being thin lie between the end of the body of the cylinder and the frame part 10 and thus will enter into the space between them. The adjuster is pushed down, springing its arms 22 around the body of the cylinder, until the parts reach the position shown in Fig. 2, with the blade to be adjusted lying opposite the slot or recess 24. Now the exposed or upper arm of lever 32 is operated to adjust the toe 33 into a position beneath the lower edge of the blade. Thereupon, nut 27 is rotated to adjust it upwardly upon shaft 26, until the toe engages the edge of the blade, further motion adjusting the left-hand end of the blade until it reaches the position shown in Fig. 2, with its cutting edge engaging the stop and gauge surface 24a.

Similar operations are performed at the opposite end of the blade holder with another adjusting device which is right-handed, as compared with the left-handed adjuster utilized at the left-hand end of the holder. Thus the two adjustments of the blade, one at each end thereof, bring its cutting edge into a position where it is uniformly spaced from the central axis of rotation throughout the entire length of the cutter. Thereupon, the clamping bolts 15 are screwed up tightly to secure the blade in place, and the adjusting devices are released by backing off their adjusting nuts and pulling them off from the cylinder.

Similar operations are performed with all cutters, the result being the adjustment or setting of all blades so that their cutting edges are uniformly spaced from the central axis.

In Figs. 1 and 2 I show two adjusting devices, left-handed and right-handed, for use at opposite ends of the cylinder. Of course, they may be combined as a single instrument, by applying the left-handed operating parts, to wit, plate 25 and lever 32, upon one end face of the body 20 and the corresponding right-handed parts on the opposite end face of the body. In that case, the left-handed portion of the tool is first used to set the blade at one end, the nearest clamping screw to that end being turned up lightly to temporarily hold that end of the blade in place, and then the same tool is applied to the opposite end of the holder, and the opposite end of the blade is adjusted and set in like manner. Then all clamping screws are screwed up tightly, as before.

All forms of tool described are of simple construction, are easily applied and manipulated, and permit the blades to be accurately set in the desired position. At the same time the tool is of relatively simple construction, can be made and sold at low cost, and is not likely to get out of order or lose its accuracy in service.

What I claim is:

1. A gauge for setting the blades in the slots of a cylindrical planer blade holder, comprising a body member provided with opposed arms formed to rest upon the holder and at one end having a flat surface lying in a plane perpendicular to the length of the holder when the gauge is applied thereto and between said arms having a gauging recess, a support formed of thin sheet metal having a body portion extending parallel to said plane and slidable upon said surface and at its outer end being provided with a flange extending over the body member, an adjusting screw extending through said flange and threaded into the body member for adjusting the support thereon, and a lever formed of thin sheet metal pivotally secured flat-wise upon said support and adapted to be inserted into a position where it is applied flatwise to the end of the blade holder, said lever being provided with a toe arranged by pivotal motion of said lever in its own plane to be engaged beneath a blade in said holder, whereby outward adjustment of said support upon said body member advances the blade edge into engagement with the bottom surface of said gauging recess and thus determines correct cutting position of the blade in the blade holder.

2. A gauge for setting the blades in the slots of a cylindrical planer blade holder, comprising a body member provided with opposed resilient arms formed to yieldingly embrace the holder and at one end having a flat surface lying in a plane perpendicular to the length of the holder when the gauge is applied thereto and between said arms having a gauging recess, a support formed of thin sheet metal having a body portion extending parallel to said plane and slidable upon said surface and at its outer end being provided with a flange extending over the body member, an adjusting screw extending through said flange and threaded into the body member for adjusting the support thereon, and a lever formed of thin sheet metal pivotally secured flatwise upon said support and adapted to be inserted into a position where it is applied flatwise to the end of the blade holder, said lever being provided with a toe arranged by pivotal motion of said lever in its own plane to be engaged beneath a blade in said holder, whereby outward adjustment of said support upon said body member advances the blade edge into engagement with the bottom surface of said gauging recess and thus determines correct cutting position of the blade in the blade holder.

EMIL H. LARKINS.

REFERENCES CITED

The following references are of record in the file of this patent:

UNITED STATES PATENTS

| Number | Name | Date |
|---|---|---|
| 186,229 | Casterline | Jan. 16, 1877 |
| 1,668,431 | Sprinkle | May 1, 1928 |
| 1,668,432 | Sprinkle | May 1, 1928 |

FOREIGN PATENTS

| Number | Country | Date |
|---|---|---|
| 546,579 | France | Aug. 26, 1922 |